Feb. 25, 1969  J. O. WEISS  3,430,127
VOLTAGE REGULATOR AND SWITCHING SYSTEM
Filed March 28, 1966  Sheet 4 of 4

Inventor
Josph Otto Weiss
By *Benjamin J. Barish*
Attorney

United States Patent Office 3,430,127
Patented Feb. 25, 1969

3,430,127
VOLTAGE REGULATOR AND SWITCHING SYSTEM
Joseph Otto Weiss, Jerusalem, Israel, assignor to State of Israel
Filed Mar. 28, 1966, Ser. No. 537,771
U.S. Cl. 323—66　　　　　　　　　　　　　7 Claims
Int. Cl. H01h 47/16; G01r 17/06

ABSTRACT OF THE DISCLOSURE

A switching system, particularly useful for a voltage regulator, comprises a sequential arrangement of relays, or other signal sensitive devices adapted to assume an actuated or a released condition. The system is adapted to receive an actuating or a releasing control signal, and includes means for directing the actuating control signal to the first released relay in the sequence and then sequentially to the remaining released ones while skipping over any actuated ones in between, and means for directing the releasing control signal to the first actuated relay in the sequence and then sequentially to the remaining actuated ones, while skipping over any released ones in between.

---

The present invention relates to a novel signal responsive switching system and also to a novel electrical regulating system utilizing this switching system. The invention is particularly, but not exclusively, suitable for use in D.C. voltage regulators, and is therefore herein described with respect to this type of system.

D.C. voltage regulators based on linear stepping for effecting the regulation, by switching impedances into the circuit, are relatively slow particularly where a wide speed of voltages is to be covered. For example, if a voltage sweep of 117.5 volts in 2.5 volt steps is required, 47 switching devices, e.g. relays, are necessary. Regulators equipped with series or shunted tubes or transistors are expensive for high power ratings, and above a certain level, as for instance in floating battery installations, price becomes prohibitive.

A broad object of the invention is to provide a novel switching system which effects switching in sequence in accordance with a signal. Such a switching system may be used in regulators as well as in other applications, such as analog-to-digital converters, as will be apparent from the description below.

A further object of the present invention is to provide an electrical regulating system which requires substantially fewer switching elements to cover the same voltage sweep as in the linear stepping system. For example, the embodiments of the invention described below, which involve the same voltage sweep of 117.5 volts in 2.5 volt steps, require but 6 switching devices or relays instead of the 47 in the linear stepping arrangement.

Among the further objects of the invention are to provide a switching system and a regulator utilizing same which can be designed to operate at a very high speed: which can be designed for use in large power system; which can be designed for use in systems having considerably different output ratings; which is of very simple construction; and which can be produced in high volume at a relatively low cost.

Briefly, the invention provides a signal responsive switching system comprising a plurality of signal sensitive devices (e.g., relays) arranged in a sequence, each being adapted to assume an actuated condition and a released condition. Means are provided for impressing onto the switching system an actuating control system or a releasing control signal. The system includes means for directing the actuating control signal to the first released signal sensitive device in the sequence and then sequentially to the remaining released signal sensing devices, while skipping over any actuated signal sensitive devices in between, for actuating each in sequence so long as the actuating control signal is present. The system further includes means for directing the releasing control signal to the first actuated signal sensitive device in the sequence and then sequentially to the remaining actuated signal sensitive devices, while skipping over any released signal sensitive device in between, for releasing each in sequence so long as the releasing control signal is present. Switching means are provided controlled by each of the signal sensitive devices.

The above switching system may be used in many application, such as analog-to-digital converters. However, a particularly important application of this switching system is for regulating the output of a power supply, wherein the actuating or releasing control signal is produced upon deviation of the output from the desired value in one or the other directions.

The invention is more particularly described below with respect to several embodiments thereof illustrated in the drawings, wherein.

Figure 1:
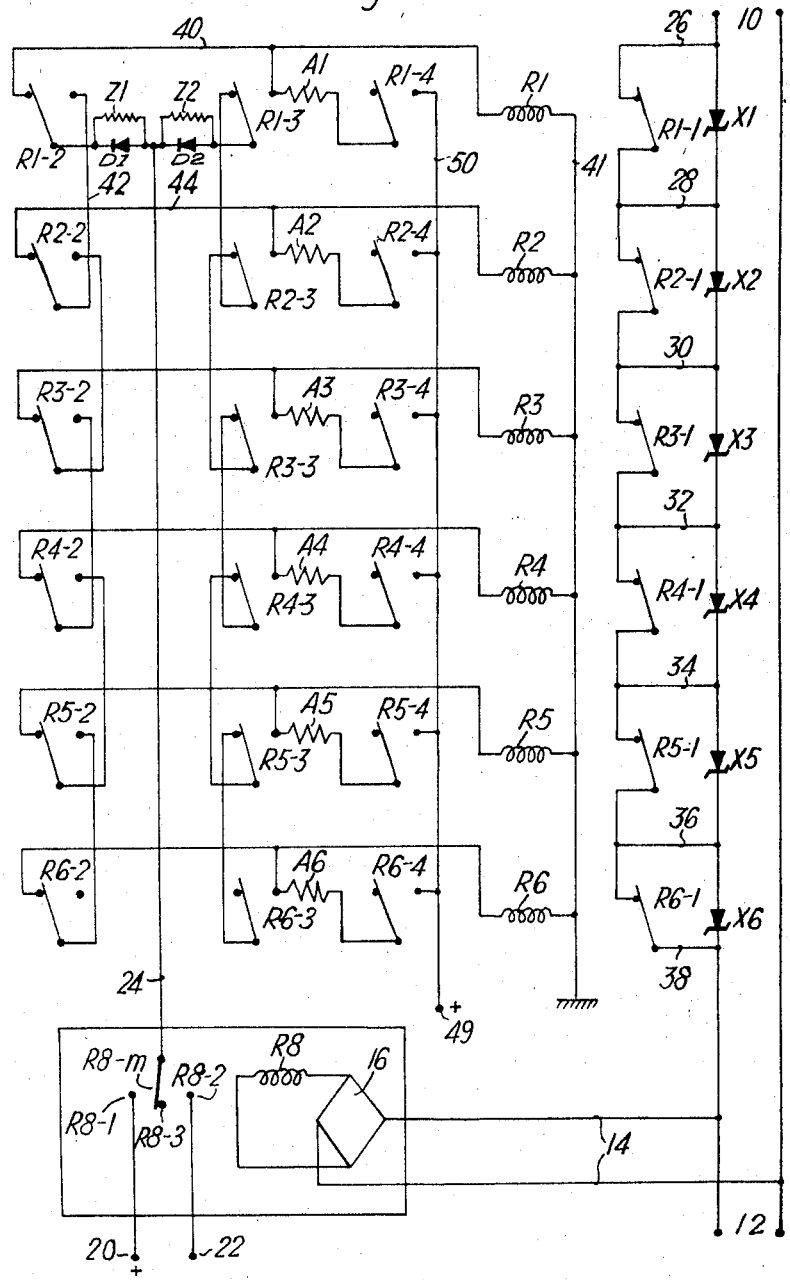
FIG. 1 is a schematic diagram of a D.C. voltage regulator constructed in accordance with the invention.

In the D.C. voltage regulator of FIG. 1, the unregulated voltage input is applied across input line terminals 10, and the regulated voltage output is taken across output line terminals 12. In series with the input-output circuit are a plurality of impedances or voltage dropping devices which are used to effect the voltage regulation. In the FIG. 1 embodiment, these devices are Breakdown diodes (e.g., of the Zener or avalanche type), there being six, X1–X6, illustrated. Diodes X1–X6 are selectively switchable into and out of the circuit to regulate the voltage output, and for this purpose each diode is shunted by a pair of contacts R1–1 to R6–1 which when closed by-pass the diode and when open effectively insert the diode into the circuit. The diodes are poled as shown in FIG. 1 so that they introduce an impedance or voltage drop in the input-output circuit when their respective contacts R1–1 to R6–1 are open.

Each of the contact pairs R1–1 to R6–1 is a part of a relay, the windings thereof being identified in the drawings by the reference numerals R1–R6. Relay windings R1–R6 are in the voltage regulating control circuit which senses the output voltage and selectively switches in or out the diodes X1–X6 to bring the output voltage to the desired value.

The output voltage sensing circuit includes a tap 14 connected across the output line 12, tap 14 serving as the input to a voltage comparing bridge 16. The latter bridge may be any one of a number of well known types which produce an output of one sign when the input voltage is higher than the reference voltage, an output of the opposite sign whent he input voltage is lower than the reference voltage, and no output when the two are substantially the same. One suitable type includes Zener diodes or voltage regulating tubes in one pair of opposing legs, and resistances in the other pair of opposing legs.

The output from bridge 16 feeds a relay winding R8 which includes three fixed contacts R8–1, R8–2 and R8–3, and a movable contact R8–m. The latter is selectively engageable with any one of the three fixed contacts depending upon whether the output from voltage comparing bridge is positive, negative, or zero, respectively. Contact R8–1 is connected to a source 20 of positive voltage; contact R8–2 is connected to a terminal 22 which is at zero voltage, i.e. ground or negative voltage; and contact R8–3 is not connected to any voltage source. Movable contact R8–m is connected to line 24. Line 24 will thus carry a positive voltage (referred to above as the "actuating control signal") if relay winding R8 is energized by a current of one sign, e.g. positive; a zero or negative voltage (referred to above as the "releasing control signal") if relay winding R8 is energized by a current of the opposite sign, e.g. negative; and will float if winding R8 is not energized. The voltage on line 24 provides the control signal for controlling the selective energization of relay windings R1–R6 and thereby the selective switching of diodes X1–X6 into the main circuit being regulated.

Each of relays R1–R6 includes four sets of contacts. With reference to relay R1, the first set (R1–1, referred to above) controls the switching-in or switching-out of its respective diodes X1; the second set, R1–2, controls the operating circuit for the relay; the third set, R1–3, controls the releasing circuit for the relay; and the fourth set, R1–4, provides a holding circuit for its relay, as the relay illustrated is a non-remanent type and therefore requires a holding circuit.

The other relays R2–R6 are of the same type and include the same four sets of contacts which are correspondingly numbered in the drawings.

The first set of contacts R1–1, which controls the insertion of the diode X1 for effecting the voltage regulation, includes a pair of normally closed contacts connected in parallel with diode X1 by a pair of leads 26 and 28, so that when the relay is de-energized, they effectively shunt the diode, i.e. switch it out of the main circuit, and when the relay is energized, they open the shunt, i.e. switch the diode into the main circuit. In a similar manner, contacts R2–1 of the second relay R2, shunt the second diode X2, by leads 28 and 30; contacts R3–1 of the third relay R3 shunt the third diode X3 by leads 30 and 32; contacts R4–1 of the fourth relay R4 shunt the fourth diode X4 by leads 32 and 34; contacts R5–1 of the fifth relay R5 shunt the fifth diode X5 by leads 34 and 36; and contacts R6–1 of the sixth relay R6 shunt the sixth diode X6 by leads 36 and 38.

The second set of contacts, e.g., R1–2 of the first relay R1, is in the operating or energizing circuit of its respective relay, and is connected between line 24 and its relay winding through a unidirectionally conducting device D1, having a bypass resistor Z1. Contacts R1–2 include two fixed contacts and a movable contact adapted to engage one under the normal or de-energized state of the relay, and the other under the energized state of the relay. The first fixed contact is connected by lead 40 to the winding of its relay R1, the other side of the relay being connected to a common lead 41 and to ground. The second fixed contact is coupled by lead 42 to the movable contact of the comparable contact set R2–2 of the second relay R2. Its first fixed contact is similarly connected to its relay winding R2 through lead 44 and its second fixed contact is connected to contact set R3–2 of the third relay R3.

The arrangement of contact sets R1–2, R2–2, R3–2, etc., is such that, when the circuit is normalized and relays R1–R6 are not energized, line 24 is connected to the first relay R1, so that any voltage signal on line 24 is first impressed on that relay winding, thereby energizing it. When this occurs, relay R1 operates its contacts R1–2 to transfer line 24 to the contact set R2–2 of the relay next in the sequence, the energize that relay if there is a voltage on the line, and then to transfer the line 24 to the next relay in the sequence, this energization of the relays and transfer to the next relay continuing so long as there is an energizing voltage on line 24, or until the last relay R6 is energized. The contacts in sets R3–2, R4–2, R5–2 and R6–2 have the same arrangement and circuit connections as those in sets R1–2 and R2–2 for accomplishing the above functions, and are therefore not described herein in detail in the interest of simplifying this disclosure.

The third set of contacts, e.g., R1–3 of the first relay R1, is in the releasing circuit of its respective relay, and is connected to line 24 through a unidirectionally conducting device D2 and a by-pass resistor Z2. Whereas the first unidirectionally conducting device D1 is poled to allow only a positive voltage on line 24 pass to contact set R1–2, the second device D2 is poled to allow only a negative current to flow to contact set R1–3. This contact set includes a movable contact connected to D2 and a pair of fixed contacts, one connected to the movable contact of the next contact set R2–3, and the other connected to the relay winding circuit, lead 40 in the case of relay R1. The movable contact normally engages the former fixed contact so that when a zero voltage, or negative voltage, appears on line 24 it is normally transferred to the movable contact of the corresponding contact set in the next relay, and so on with respect to the other relays in the sequence. However, if any relay in the sequence is energized, then that contact set, e.g. R1–3 of relay R1, is actuated so that its movable contact is caused to engage the fixed contact in the relay winding circuit (e.g. line 40) whereby the zero or negative voltage on line 24 is impressed on its relay winding (e.g. R1), de-energizing the relay.

It is thus seen that when the voltage on line 24 is zero or negative, such voltage will be impressed on the first relay winding R1–R6 which had previously been energized to de-energize it, whereupon the voltage on line 24 will be transferred to the next succeeding energized relay winding in the sequence, this sequential transferring continuing so long as the voltage remains zero or negative on line 24, or until all the relays are de-energized.

The fourth set of contacts, e.g., R1–4 of the first relay R1, provides a holding circuit for its respective relay winding when the latter has been energized. The relays used in this embodiment are the non-remanent type; i.e., when the current through their windings terminates, they would tend to return to their released or normal state. Accordingly, a holding circuit for maintaining the current through their windings is necessary in this embodiment. Contact set R1–4, which provides such a holding circuit for relay R1, includes two fixed contacts and a movable contact, the latter being connected through a current limiting resistor A1 to the winding of relay R1 through line 40. One fixed contact is connected to a source 49 of positive voltage through line 50, so that when relay R1 is energized, its movable contact connects the positive voltage on line 50 to relay winding R1, this circuit holding the current until relay R1 is otherwise de-energized.

In a similar manner; contact sets R2–4, R3–4, R4–4, R5–4 and R6–4 establish holding circuits to their relay windings as each is energized.

Voltage regulating diodes X1–X6 preferably have different values enabling a wide range of voltage regulation to be effected by switching in various combinations of the diodes: in FIG. 1, for example, X1 provides a voltage drop of 2.5 volts; X2, 5 volts; X3, 10 volts; X4, 20 volts; X5, 40 volts; and X6, 40 volts. This arrangement provides a voltage sweep of 117.5 volts in steps of 2.5 volts.

Figure 2:
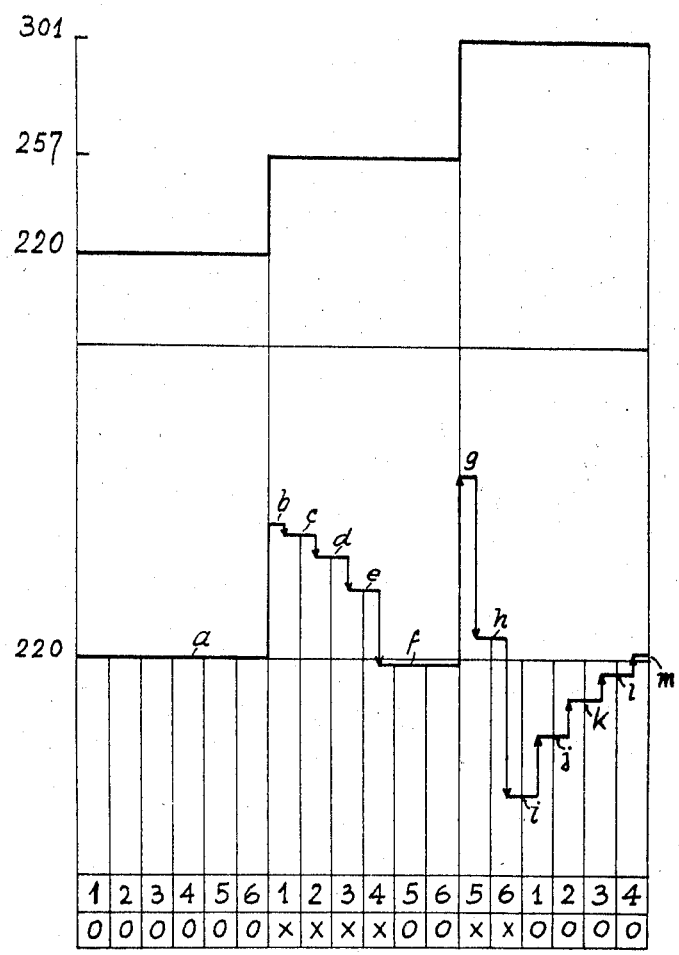
FIG. 2 is a diagram illustrating the input voltage, and the output voltage produced as a result of the operation of the regulator of FIG. 1.

The operation of the circuit of FIG. 1 will now be described particularly with reference to FIG. 2 which illustrates how the voltage regulator operates when different voltages are applied to the input line 10. The upper wave form in FIG. 2 indicates the voltage of the input line 10, and the lower wave form indicates the voltage at the output 20 as a result of the operation of the relays R1–R6 in the voltage regulating circuit. The state of the relays is also shown in FIG. 2, an x indicating the relay is in its operating state, and on *o* indicating it is in its released state.

It is assumed that the voltage regulator is adjusted to have a voltage output of 220 volts, ± 1.5 volts. In other words, if the circuit is in its normal state as shown, with all the relays R1–R6 in their released condition, and 220 volts is applied to the input, then all the diodes are shunted as shown and 220 volts appears at the output 12. If a larger voltage is applied to the input 10, then relays R1–R6 begin to operate switching in certain diodes X1–X6 to provide the required output voltage the switching continuing until the circuit has adjusted itself to provide the 220 volts, ± 1.5 volts at the output.

Assuming first that 220 volts is applied to input 10, it will be seen that 220 volts appears at the output 12, and thereby also across line 14 which provides the input for voltage comparing bridge 16. Since this bridge is set for a voltage of 220 volts, no output is produced across line 18, and no current is driven through its relay winding R8. Therefore, its movable contact R8–*m* engages fixed contact R8–3, and, therefore, no voltage is applied to line 24. Accordingly, all the switching relays R1–R6 remain in their released condition as shown in FIG 2, with the output voltage at 220 volts, as indicated by *a*.

Now, assume that 257 volts is applied across input 10. Since all the diodes X1–X6 are still shunted, the same 257 volts will appear across output line 12 (point *b* in FIG. 2), and across the input to the voltage comparing bridge 16. This will produce a positive voltage output from the bridge which will drive positive current through relay R8, actuating same to move its movably contact R8–*m* into engagement with contacts R8–1. This connects the positive voltage of line 20 to line 24.

This positive voltage of line 24 serves as the "actuating control signal," referred to below and is applied to contacts R1–2 of relay R1 through rectifier D1, and since this contact set is in its released condition as shown in FIG. 1, the positive voltage is impressed on relay winding R1. This actuates relay R1 causing it to move its contacts R1–1, R1–2, R1–3 and R1–4 to their actuated positions.

Actuation of contacts R1–1 opens the shunt of diode X1, and thereby switches that diode into the main circuit.

Actuation of contacts R1–2 opens the energizing circuit to relay winding R1 and transfers the positive voltage of line 24 to contacts R2–2 of relay R2, the next relay in the sequence. The effect this has on the circuit will be described below.

Actuation of contacts R1–3 does not affect the circuit operation at this time, since this contact set is in the releasing circuit and is effective when the relays are being released rather than actuated. This will also be described below more fully.

Actuation of contasts R1–4 establishes a holding circuit for relay R1, this circuit being necessary in this case since nonremanent relays are used and the energizing circuit was interrupted by actuation of contacts R1–2. The holding circuit extends from line 50 connected to a positive voltage source, contacts R1–4, current limiting resistor A1, line 40, relay winding R1, line 41, and ground.

The above described actuation of relay R1 has thus switched-in diode X1, causing a 2.5 volt drop and thereby decreasing the output voltage appearing across line 12, from 257 volts to 254.5 volts. This is the voltage at point *c* in the diagram of FIG. 2. However, the output voltage is still above that for which the voltage comparator bridge 16 is adjusted, and therefore relay R8 remains energized and contact R8–*m* remains engaged with contact R8–1. Line 24 thus retains the positive voltage applied from line 20, but because of the previous actuation of contact set R1–2 of relay R1, this positive voltage is now applied to contact set R2–2. Relay R2 is thus energized which causes it to actuate its contact sets in the same manner as described above with respect to relay R1. Actuation of contacts R2–1 switches-in diode X2; actuation of contacts R2–2 transfers the voltage of line 24 to contact set R3–2 of relay R3, this being the next relay in the sequence; actuation of contacts R2–3 does not affect the circuit at this time, this contact set being in the release circuit of the relay; and actuation of contacts R2–4 establishes a holding circuit for relay R2.

With the switching-in of diode X2, another 5 volts is subtracted from the output, bringing the output voltage to 249.5 volts. This is point *d* in the chart of FIG. 2. However, since the regulated voltage of 220 volts has not yet been attained, relay R3 will be actuated in the same manner as described above, to switch-in diode X3 and thus subtract another 10 volts from the output bringing the output to 239.5 volts, which is point *e* in the chart of FIG. 2. A voltage output will still be produced by bridge 16 causing relay R8 to maintain the connection with line 20 so that the positive voltage is still retained on line 24, and therefore the next relay in the sequence, relay R4, will be actuated to switch-in its diode X4. This causes a further voltage drop of 20 volts bringing the output voltage across line 12 to 219.5 volts, point *f* in the chart of FIG. 2. This output voltage conforms to the setting of the voltage regulator, namely 220 volts, ±1.5 volts, and therefore the switching-in of further diodes is terminated, as follows:

Since the voltage output across line 12, and thereby across tap 14, agrees with the voltage required as controlled by the setting of voltage comparator bring 16, no output is produced from the bridge and therefore relay R8 is de-energized. Actually, there might be a small output from the bridge, but unless the voltage difference exceeds the 1.5 volts tolerance of the regulator this output would be insufficient to energize relay R8. Contact R8–*m* of this relay is thus returned to its normal position in engagement with contact R8–3. This disconnects line 24 from the positive voltage of line 20. Since there is no longer a positive voltage on line 24, the relay next in the sequence, which in this example would be relay R5, would not be energized. The sequential energization of the relays R1–R6 thus terminates with the termination of the positive voltage on line 24. However, the relays which had been previously energized remain energized because of their holding circuits through their respective contacts R1–4, R2–4, etc. Also, their contacts R1–1 remain in their actuated positions, retaining their respective diodes X1–X6 in the circuit.

Now assume that voltage of 301 volts is next applied to the input line 10. This means that the input has been increased by 44 volts (from 257 to 301 volts) thereby causing the output across line 12 to increase by 44 volts, from 219.5 volts to 263.5 volts, which is point *g* in the chart of FIG. 2. Meanwhile, the circuit is still in the state described previously and illustrated in FIG. 2, where relays R1–R4 are in their operated condition and relays R5–R6 are in their released condition. Also, it will be recalled that when relay R4 was actuated, it transferred line 24 to contact set R5–2 of relay R5.

With the output voltage across line 12 in excess of the predetermined voltage, relay R8 will again be energized connecting line 24 with the positive voltage of line 20, thereby energizing relay R5 through contact set R5–2. The actuation of relay R5 introduces diode X5 into the circuit causing a voltage drop in the output of 40 volts. The voltage appearing at the output is thus decreased from 263.5 volts to 223.5 volts, point *h* in FIG. 2. This is still in excess of the required voltage, which causes relay R6 to be operated and thereby introduces diode X6 into the circuit, decreasing the voltage output by another 40 volts to 183.5 volts, point *i* in FIG. 2.

It will now be seen that the voltage at the output is below, rather than above, the required voltage of 220 volts, −1.5 volts. This produces an output across voltage comparator bridge 16 of opposite polarity, reversing the current in relay R8, and thereby connecting line 24 with the zero or ground voltage on line 22, supplying the "releasing control signal" referred to above.

Because of the arrangement of diodes D1 and D2, this zero or ground voltage on line 24 is applied to contacts R1–3 or relay R1. Now, if relay R1 were then in its released condition, this negative voltage would be transferred to the corresponding contact set of the relay next in the sequence. However, relay R1 is in its operated condition as described above, and, therefore, contact set R1–3 is in its actuated condition where its movable contact is in engagement with the contact connected to line 40. The zero voltage on line 24 is thus connected to relay winding R1. Since the relay is of the non-remanent type, the relay releases and thereby returns all its contacts to their normal or released conditions.

If relays R1–R6 were of the remanent type, then the holding circuit including positive voltage source 49, line 50, contacts R1–4 and resistor A1, would not be necessary, but it would be necessary to connect line 22 to a source of negative current in order to release the relay. Thus, source 22 would be zero voltage or ground if non-remanent relays are used, and negative if remanent relays are used.

Release of contacts R1–1 shunts out diode X1; release of contacts R1–2 restores the connections of line 24 to relay winding R1; release of contacts R1–3 restores the connection of line 24 to contacts R2–3 of the next succeeding relay; and release of contacts R1–4 opens the holding circuit to relay R1.

With the release of contacts R1–1 and the switching-out of diode X1, the output voltage is increased by 2.5 volts, bringing it up to 186 volts, which is point $f$ in the chart of FIG. 2. The voltage is still below that required, and, therefore, relay R8 still retains line 24 connected with the zero voltage source of line 22. This zero voltage is applied to the next energized relay in the sequence, which in this case is relay R2, the circuit extending through normalized contacts R1–3 of relay R1 and the actuated contacts R2–3 of relay R2. Relay R2 is thus released causing the normalization of its contacts, including its contacts R21, which adds 5 volts to the output, bringing it to 191 volts. This output voltage is seen at point "$k$" in the chart of FIG. 2.

The output voltage is still below that required and, therefore, the next relay in the sequence which has been energized, namely relay R3, is released causing the normalization of its contacts, and thereby the addition of 10 volts of diode X3 to the output voltage, which brings the latter to 201 volts, point 1 of FIG. 2. In a similar manner, relay R4 is released adding the 20 volts of diode X4 to the circuit, bringing it to 221 volts, point $m$ of FIG. 2. The output voltage is now within the 1.5 volts tolerance range of the required 220 volt output. The current through relay R8 therefore ceases, connecting line 24 to contact R8–3 which removes the zero voltage from that line. Further releasing of the relays is thereby terminated.

At this stage, the condition of the circuit is as shown at the end of the diagram in FIG. 2, relays R1–R4 being in their released condition and relays R5 and R6 being in their operated condition. In order to avoid hunting during the switching of relays R1–R6, the latter should be slower operating than control relay R8.

Figure 3:
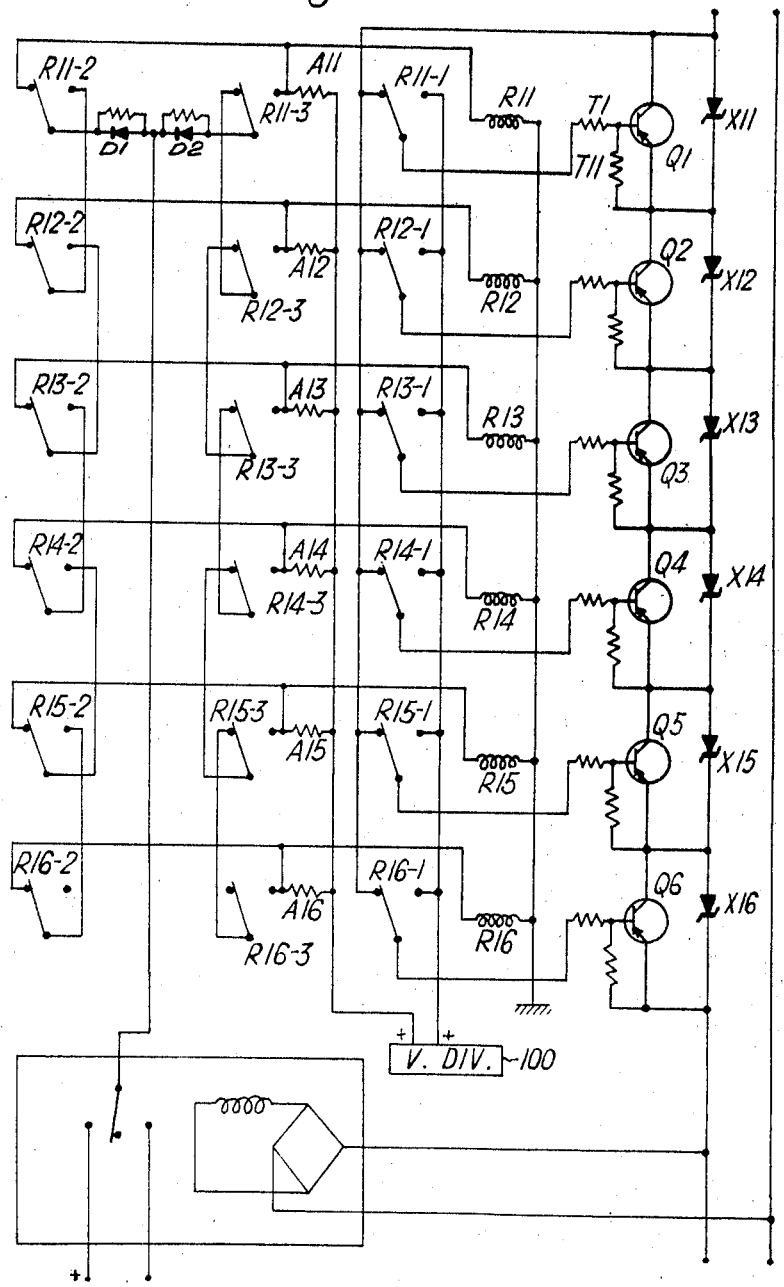
FIG. 3 is a schematic diagram of another form of D.C. regulator in accordance with the invention, but designed specially for high-speed operation.

FIG. 3 is a variation of the circuit of FIG. 2, particularly adapted for high-speed operation. The circuit of FIG. 3 uses transistors Q1–Q6 as switches in place of diodes X1–X6. Further, this circuit uses high-speed, vacuum reed relays. These are labelled R11–R16 and are comparable to relays R1–R6 in FIG. 1. Reed relays are faster operating, and therefore are preferable in a high speed circuit. A voltage divider 100 is provided for applying the proper voltages in the holding circuits and the transistor circuits.

In the circuit of FIG. 3, the holding circuit for each of the relays R11–R16 is continuously energized for all the relays (and not for just the energized ones, as in FIG. 1) since only a small current is necessary in the holding circuit of a reed relay to keep the relay in its actuated condition once it has been actuated, this small current being ineffective to actuate it if it has not been otherwise actuated.

Each of the relays R11–R16 includes 3 sets of contacts, these being (for relay R11): contacts R11–1, corresponding to R1–1 of FIG. 1; contacts R11–2, corresponding to R1–2 of FIG. 1; and contacts R11–3, corresponding to R1–3. In the FIG. 3 embodiment, the fourth set of contacts comparable to R1–4 is omitted since, as explained above, the holding circuit in the FIG. 3 embodiment is continuously applied to all the relays, whether they are in their actuated or released conditions.

The means for sensing the output voltage and for thereby controlling the operation of the relays is the same in FIG. 3 as described with respect to FIG. 1. Also, the contacts of the relays for controlling the operating and releasing circuits in response to the presence of an overvoltage or undervoltage are also the same. What remains to be described, therefore, is the circuit for controlling the transistors Q1–Q6, and also the modified holding circuits for relays R11–R16.

The transistors Q1–Q6 are normally in their conducting states so that each shunts its respective diode X11–X16. When it is desired to introduce the voltage drop of a diode into the circuit, the respective transistor is cut-off. Each of the transistors Q1–Q6 includes a collector connected to the diode at the negative side of the line, an emitter connected to the other side of the diode, and a base connected through a resistor T1 to switch contacts R11–1 of its respective relay R11. The transistor base is also connected through a second resistor T11 to the transistor emitter. Voltage divider 100 provides positive voltage to the actuated fixed contact sets R11–1, R12–1, R13–1, R14–1, R15–1 and R16–1.

The arrangement is such that under normal conditions the collector and the base electrodes of all the transistors Q1–Q6 are more negative with respect to the emitter electrodes, and therefore the transistors normally are in their conducting states. However, when a relay R11–R16 is operated as described above with respect to FIG. 1, actuation of its contacts, e.g., R11–1 of relay R11, impresses the positive voltage of voltage divider 100 to the base electrode of the respective transistor, e.g., Q1, causing its conduction to cease. This in effect switches its respective diode, e.g., X11, into the circuit, the circuit being otherwise regulated in the same manner as described above with respect to FIG. 1.

As briefly mentioned earlier, the holding circuits for the relays R11–R16 do not extend through any of the contacts for these relays. These holding circuits are supplied by voltage divider 100 through current-limiting resistors A11–A16, there being one for each of the relays R11–R16.

Assuming that all the voltage drops between 220 volts and 337.5 volts occur with equal probability, the average switching sequence involves 7 operations to achieve regulation. If the voltage drop range of 2.5 volts to 20 volts is 5 times more frequent, then only 5 operations are necessary. In the majority of cases, an average of about 6 operations would be involved in achieving regulation.

Vacuum high-speed reed relays, such as might be used in the FIG. 3 embodiment, make and break in about 1 millisecond. The average regulation time would then be about 6 milleseconds. Voltage rise and drop speed is computed by taking the mean voltage drop and dividing it by the mean regulation time. In this case, the mean voltage drop is one half of the voltage sweep of 117.5 volts, or about 59 volts; and the mean regulation time is 6 milleseconds. Accordingly, the voltage rise and drop speed in a system such as FIG. 3, utilizing high-speed vacuum reed relays, would theoretically be, in the average, 9800 volts/sec. which is an excellent value.

Figure 4:
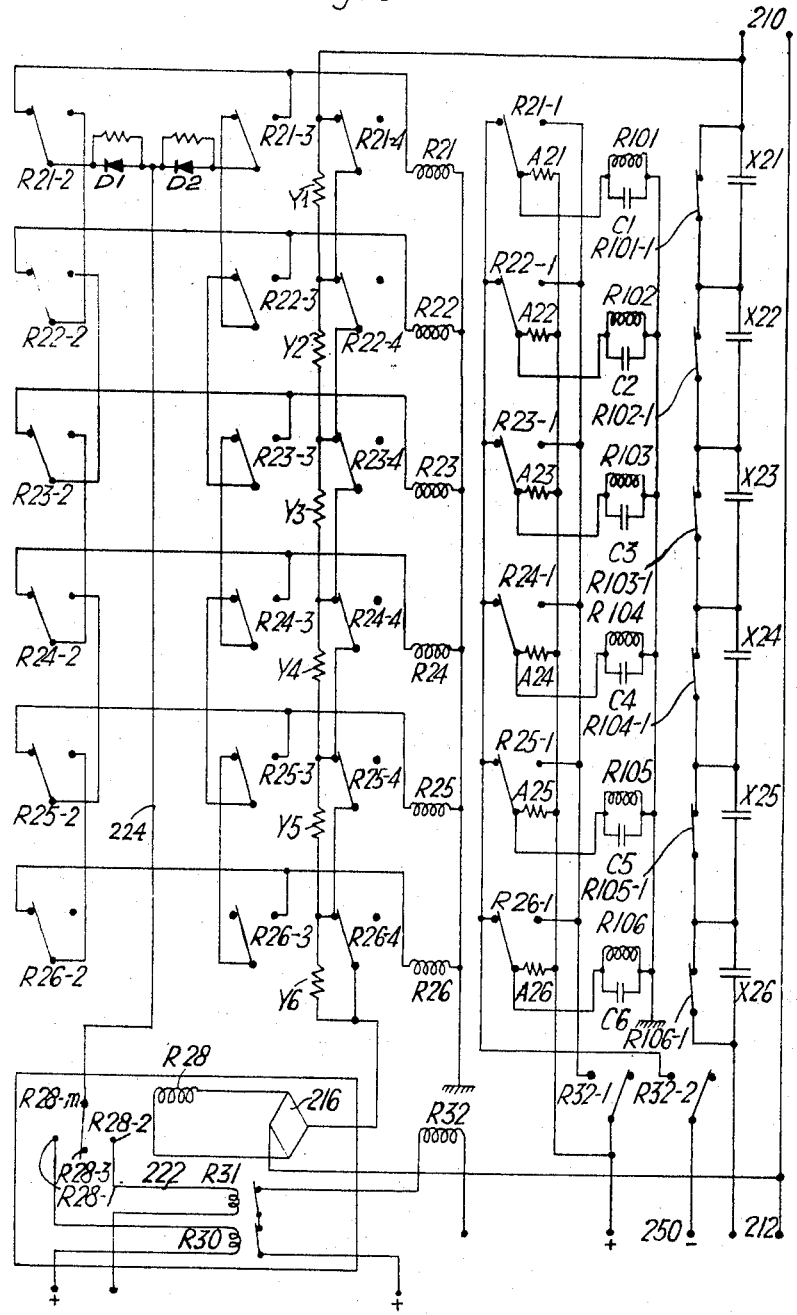
FIG. 4 is a schematic diagram of another form of D.C. regulator in accordance with the invention, but designed specially for high-power systems.

FIG. 4 illustrates a further variation in the circuit, for high current applications. Here, the voltage dropping devices or impedances, comparable to the diodes of FIGS. 1 and 3, are contracells X21–X26, which are adapted to carry high amperage current, in the order of up to several hundred amps.

The circuit of FIG. 4 provides an arrangement whereby the voltage regulating relays which are constantly switching to adjust themselves to the required voltage, are substantially isolated from the main circuit carrying the heavy current. This is accomplished by placing the voltage regulating relays in a light-current auxiliary circuit isolated from the heavy-current main circuit, effecting the necessary switching of the voltage regulating relays in this auxiliary circuit, and then controlling the heavy-current main circuit in accordance with the previously operated positions of the voltage regulating relays in the auxiliary circuit. The main circuit also includes voltage regulating relays adapted for carrying the high current. These relays are not continuously operated and released to effect the regulation in the main circuit, but rather are actuated or released all at one time. This occurs after the relays in the auxiliary circuit have attained their quiescent condition upon completion of the required voltage regulation.

In the FIG. 4 embodiment, the contracells X21–X26 are included between the input and output lines of the main circuit, and are each shunted by a normally closed contact controlled by a heavy-duty relay. The heavy-duty relays are identified by the reference numerols R101–R106, and their contacts are identified by the reference numerals R101–1 to R106–1, respectively. Each of the heavy-duty relays is shunted by a condenser C1–C6, to provide a time delay for the actuation of its respective relay. As will be described more fully below, the relays R101–R106 are not operated sequentially, as in the previously described embodiment, but rather are operated all at one time after the relays in the auxiliary circuit have been operated and have reached a quiescent condition.

The auxiliary circuit includes a plurality of relays R21–R26, comparable to the relays R1–R6 in the FIG. 1 embodiment. The first contact set of the latter relays, e.g., contacts R21–1 of relay R21, is connected in the circuit for controlling the energization of heavy-duty relays R101–R106. The second set of contacts, e.g., R21–2, is connected in the operating circuit of its respective relay in the same manner as described above. It third set of contacts, e.g., R21–3, is connected in the releasing circuit of the relays, as also described earlier. Its fourth set of contacts, e.g., R21–4, is used to regulate the voltage in the auxiliary circuit, until that voltage matches the required one. Relays R21–R26 are of the remanent type, and therefore do not require holding circuits.

The means for sensing the output voltage in the auxiliary circuit is substantially the same as in the previous embodiments. Here, however, the voltage comparator bridge 216 is supplied from the input of the main circuit line, and produces an input to bridge 216 which is a representation of the output of the main circuit. This is accomplished in the auxiliary circuit by a series of impedances Y1–Y6 comparable to diodes X1–X6 of FIG. 1, and contracells X21–X26 of this FIG. 4. Each of the impedances Y1–Y6 is normally shunted by a set of contacts of the relays R21–R26. Contacts R21–4 thus normally shunt impedance Y1, contacts R22–4 normally shunt impedance Y2, and so on through impedance Y6. When one of the relays R21–R26 is operated, it thereby opens the shunt to its corresponding impedance, introducing the voltage drop of that impedance in the auxiliary circuit between the input and the output of the auxiliary circuit, in the same manner as in FIG. 1.

The output of the auxiliary circuit is applied to the voltage comparator bridge 216 which controls relay R28 in the same manner as relay R8 is controlled in FIG. 1. Relay R28 also is adapted to connect line 224, comparable to line 24 of FIG. 1, to a line 220 carrying a positive voltage or to a line 222 carrying a negative voltage. Here, however, positive voltage line 220 is connected to a relay R30, and negative voltage line 222 is connected to another relay R31, both relays having contacts in series with a further relay R32. The arrangement is such that if either relay R30 or R31 carries current, the circuit to relay R32 will be open. In other words, relay R32 will become energized only when line 224 is connected to neither the positive voltage line 220 nor to the negative voltage line 222, which condition occurs only when the voltage regulating relays R21–R26 have completed their sequential operation and have attained the quiescent state.

Relay R32 controls the circuits of the heavy-duty relays R101–R106. When relay R32 is actuated, it moves its contacts R32–1 and R32–2 to connect the circuits of heavy-duty relays R101–R106 to the contacts R21–1, R22–1 etc., of the relays R21–R26 in the auxiliary circuit, to cause the heavy-duty relays to be actuated or released in accordance with the condition of relays R21–R26.

The operation of the circuit of FIG. 4 should now be apparent from the above brief description. The voltage input is applied across input line 210, and the output across line 212 is directly controlled by the condition of contacts R101–1 to R106–1, the latter determining whether their respective contracells X21–X26 are in this circuit. The placement of the voltage regulating system in the auxiliary circuit enables the contacts R101–1, etc., of the main circuit, to be actuated at one time, rather than sequentially. The auxiliary circuit, although it duplicates the voltages in the main circuit, carries a much lighter current and therefore can tolerate continuous switching more than the main circuit.

The input to the auxiliary circuit is taken from the input of the main circuit. Its impedances Y1–Y6 correspond to contracells X21–X26, and its contacts R21–4 through R26–4 correspond to contacts R101–1 to R106–1. The voltage regulation in the auxiliary circuit takes place exactly in the same manner as described in the, e.g. FIG. 1, embodiment of the invention, which means that relays R21–R26 will actuate their contacts R21–4 to R26–4 to control impedances Y1–Y6, in this case load resistors, in accordance with the required voltage output. While this regulation occurs, contact R28–$m$ of relay R28 is either in engagement with contact R28–1 connecting line 224 to positive line 220, or it is in engagement with contact R28–2 connecting line 224 with negative line 222. Accordingly, as regulation is occuring, either relay R30 or R31 will be energized, which opens the circuit to relay R32. As soon as the regulation in the auxiliary circuit is completed, contact R28–$m$ engages contact R28–3 of relay R28 which disconnects line 224 from the voltage-carrying lines 220 and 222. Both relays R30 and R31 are thus de-energized, which closes the circuit to relay R32 and energizes that relay, causing it to actuate its contacts R32–1 and R32–2.

When the latter occurs, the heavy-duty relays R101–R106 are connected to voltage source 250, the circuit of each relay including one of the contact sets R21–1 to R26–1. That is to say, the condition of relays R21–R26, (i.e. whether in its operated or released condition) will be manifested by the condition of their respective contacts R21–1 to R26–1, and the heavy-duty relays R101–R106 will be placed in the same condition (i.e. actuated or released) when relay R32 is operated. It will be appreciated that relays R101–R106 are actuated substantially simultaneously and not sequentially as was the case with respect to the relays in the auxiliary circuit. Actuation or release of heavy-duty relays R101–R106 controls the opening or closing of its contacts R101–1, which in turn controls whether their respective contracells X21–X26 are in the circuit.

The embodiment of FIG. 4 also includes a holding circuit for each of the heavy-duty relays R101–R106, this holding circuit extending from one side of voltage source 250 through current-limiting impedances A21–A26, through the windings of relays R101–R106, and to ground.

The unidirectionally conducting devices D1 and D2 are actually needed only when using remanent relays whose actuating current is not substantially large compared to the releasing current. The impedances or voltage dropping devices, e.g. X1–X6 of FIG. 1, could obviously be selected from, and therefore contemplate, any of the known devices useful for regulating electrical outputs, and could include forward or backward voltage generating devices such as transformers, electrolytic cells, and the like.

It will be appreciated that the electrical regulating system described may be used in other applications, in other number systems (e.g. decadic), and with other devices. For example, solid-state switching devices could be used for the relays. Also, the regulator could be used in A.C. systems. Further, the sequentially-stepping switching system described could be used in other applications, for example, in automatic potentiometers, analogue-digital converters, code-to-code transfer circuits, synchro-systems, counters, and the like.

I claim:
1. A signal responsive switching system comprising a plurality of signal sensitive devices arranged in a sequence; each of said signal sensitive devices being adapted to assume an actuated condition and a released condition; means for impressing onto said switching system an actuating control signal or a releasing control signal; means for directing the actuating control signal to the first released signal sensitive device in the sequence and then sequentially to the remaining released signal sensitive devices, while skipping over any actuated signal sensitive device in between, for actuating each in sequence so long as said actuating control signal is present; means for directing the releasing control signal to the first actuated signal sensitive device in the sequence and then sequentially to the remaining actuated signal sensitive devices, while skipping over any released signal sensitive device in between, for releasing each in sequence so long as said releasing control signal is present; and switching means controlled by each of said signal sensitive devices.

2. A signal responsive switching system as defined in claim 1, wherein said signal sensitive devices are electrical relay windings and said switching means are switch contacts controlled by said relay windings.

3. An electrical regulating system comprising a signal responsive switching system as defined in claim 1, an input line, an output line, means for sensing the output on said output line and for developing the said actuating or releasing control signal upon deviation of the output from the desired value in one or the other direction and for introducing it into said signal responsive switching system, and circuit means including a plurality of devices selectively switchable into and out of said circuit means by said signal responsive switching system to regulate the output on said output line.

4. A system as defined in claim 3, wherein said sensing means senses the voltage of the electrical output, and said selectively switchable devices are voltage dropping devices.

5. A system as defined in claim 4, wherein at least some of the voltage dropping devices are of smaller value than the others, the voltage dropping devices being arranged in a comparable sequence as their respective signal sensitive devices, with the lowest value voltage dropping device being controlled by the first signal sensitive device in the sequence, and the highest value voltage dropping device being controlled by the last signal sensitive device in the sequence.

6. A system as defined in claim 3, wherein the means for sensing the electrical output comprises a bridge network having an input connected to the regulated voltage output line, and a relay controlled by the output of said bridge network for selectively providing said actuating or releasing control signals.

7. An electrical regulating system comprising an auxiliary circuit and a main circuit, the auxiliary circuit including an electrical regulating system as defined in claim 3, means for coupling said auxiliary circuit to the main circuit; and means for controlling the output of the main circuit in response to the regulation of the auxiliary circuit.

References Cited

UNITED STATES PATENTS

| | | | |
|---|---|---|---|
| Re. 23,531 | 7/1952 | Villebonnet | 323—66 |
| 1,070,099 | 8/1913 | Baluss | 323—66 |
| 2,509,262 | 5/1950 | Cohen | 323—64 |
| 3,119,057 | 1/1964 | Wilson | 321—19 |
| 3,202,904 | 8/1965 | Madland | 323—58 |
| 3,255,403 | 6/1966 | Beaver et al. | 323—43.5 |
| 3,295,047 | 12/1966 | Tarczy-Hornoch | 321—15 |

WARREN E. RAY, *Primary Examiner.*

U.S. Cl. X.R.

307—130; 317—139; 323—15, 22